United States Patent
Jenkins, IV et al.

(10) Patent No.: US 7,536,559 B1
(45) Date of Patent: May 19, 2009

(54) METHOD AND APPARATUS FOR PROVIDING SECURE PROGRAMMABLE LOGIC DEVICES

(75) Inventors: Jesse H. Jenkins, IV, Danville, CA (US); Frank C. Wirtz, II, Corrales, NM (US); Roy D. Darling, Albuquerque, NM (US); Thomas J. Davies, Jr., Albuquerque, NM (US); Eric E. Edwards, Albuquerque, NM (US)

(73) Assignee: Xilinx, Inc., San Jose, CA (US)

( * ) Notice: Subject to any disclaimer, the term of this patent is extended or adjusted under 35 U.S.C. 154(b) by 820 days.

(21) Appl. No.: 11/123,531

(22) Filed: May 5, 2005

(51) Int. Cl.
*H04L 9/32* (2006.01)

(52) U.S. Cl. ...................... 713/189; 713/190

(58) Field of Classification Search ............ 726/26, 726/30; 713/174, 189, 190, 192–194; 380/265
See application file for complete search history.

(56) References Cited

U.S. PATENT DOCUMENTS

| | | | | |
|---|---|---|---|---|
| 4,617,479 | A | * | 10/1986 | Hartmann et al. ...... 365/185.17 |
| 4,849,928 | A | * | 7/1989 | Hauck ........................ 716/1 |
| 6,466,049 | B1 | | 10/2002 | Diba et al. |

\* cited by examiner

*Primary Examiner*—Hosuk Song
(74) *Attorney, Agent, or Firm*—Robert M. Brush

(57) ABSTRACT

Method and apparatus for providing secure programmable logic devices is described. One aspect of the invention relates to securing a programmable logic device having instruction register logic coupled to control logic via an instruction bus. A non-volatile memory is provided for storing at least one security bit for at least one instruction associated with the programmable logic device. Gating logic is provided in communication with the non-volatile memory and at least a portion of the instruction bus. The gating logic is configured to selectively gate decoded instructions transmitted from the instruction register logic towards the control logic based on state of the at least one security bit.

20 Claims, 5 Drawing Sheets

METHOD AND APPARATUS FOR PROVIDING SECURE PROGRAMMABLE LOGIC DEVICES

FIELD OF THE INVENTION

One or more aspects of the present invention relate generally to programmable logic devices and, more particularly, to a method and apparatus for providing secure programmable logic devices.

BACKGROUND OF THE INVENTION

Programmable logic devices (PLDs) are a well-known type of integrated circuit that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and the like.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and the like.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. In some CPLDs, configuration data is stored on-chip in non-volatile memory (e.g., FLASH memory). In other CPLDs, configuration data is stored on-chip in non-volatile memory, then downloaded to volatile memory (e.g., static memory cells) as part of an initial configuration sequence.

PLDs are typically controlled by an instruction set. On CPLDs, these instructions are typically IEEE 1149.1 (Joint Test Action Group (JTAG)) or IEEE 1532 (In-System Configurable (ISC)) compliant instructions. On FPGAs, instructions can be either JTAG/ISC compliant instructions or configuration bitstream instructions. The instructions for PLDs are used both for testing the device and its board connections, as well as for reading, writing, and erasing the volatile and/or non-volatile memories on the chip.

In some cases, it is desirable to include security features for controlling access to the volatile and/or non-volatile memories on a PLD. One proposed solution is to provide the ability to completely disable the boundary scan port on the PLD to prevent the PLD from receiving any instructions. While such boundary scan blocking reduces the potential for a hacker to reverse engineer a design in a PLD, such blocking has the disadvantage of relinquishing boundary scan compliance for the sake of security. Accordingly, there exists a need in the art for an improved method and apparatus for providing secure programmable logic devices.

SUMMARY OF THE INVENTION

Method and apparatus for providing secure programmable logic devices is described. One aspect of the invention relates to securing a programmable logic device having instruction register logic coupled to control logic via an instruction bus. A non-volatile memory is provided for storing at least one security bit for at least one instruction associated with the programmable logic device. Gating logic is provided in communication with the non-volatile memory and at least a portion of the instruction bus. The gating logic is configured to selectively gate decoded instructions transmitted from the instruction register logic towards the control logic based on state of the at least one security bit.

Another aspect of the invention relates to securing a programmable logic device having instruction register logic coupled to control logic having a control bus. A non-volatile memory is provided for storing at least one security bit for instructions associated with the programmable logic device. Gating logic is provided in communication with the non-volatile memory and at least a portion of the control bus. The gating logic is configured to selectively gate control signals produced by the control logic based on state of the at least one security bit. The control logic generates the control signals in response to decoded instructions from the instruction register logic.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Method and apparatus for providing secure programmable logic devices is described. One or more aspects of the invention are illustratively described with respect to a complex programmable logic device (CPLD). Those skilled in the art will appreciate, however, that the invention may be used with other types of programmable logic devices (PLDs), such as field programmable gate arrays (FPGAs).

Figure 1:
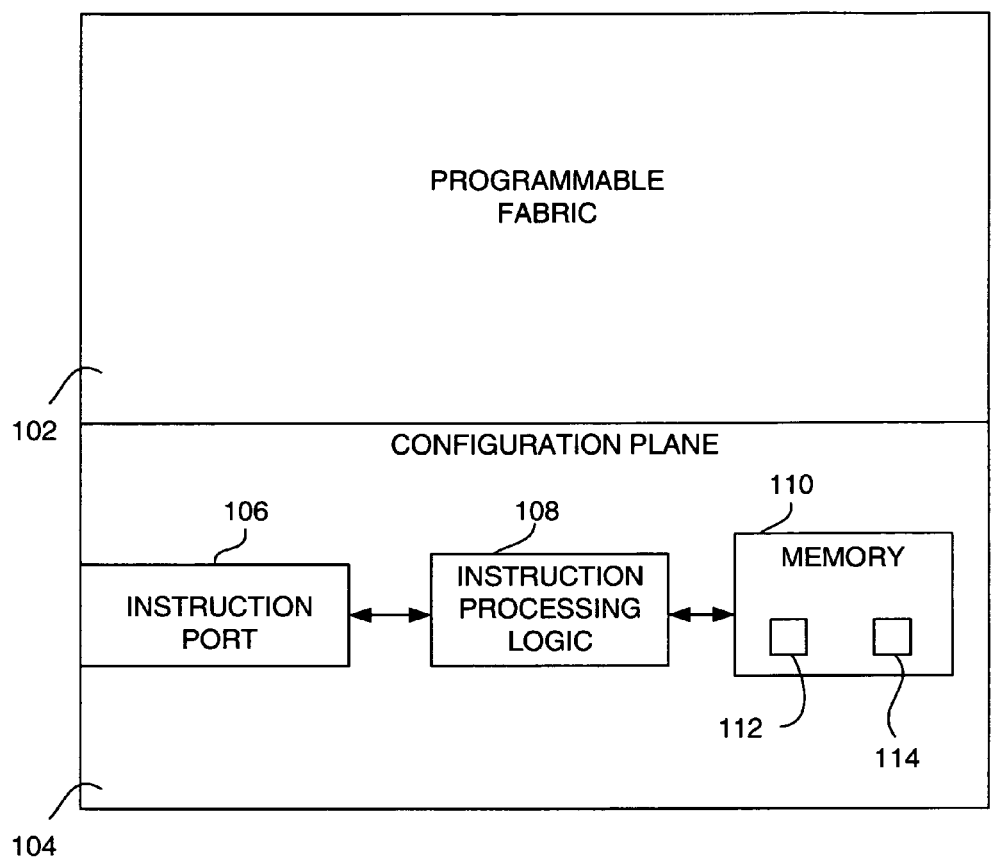
FIG. 1 is a block diagram depicting an exemplary embodiment of a programmable logic device (PLD)

FIG. 1 is a block diagram depicting an exemplary embodiment of a programmable logic device (PLD) 100. The PLD 100 comprises a programmable logic plane 102 and a configuration plane 104. The programmable logic plane 102 includes various types of programmable resources for implementing the logic of a user design. An exemplary embodiment of the programmable logic of a CPLD is described below with respect to FIG. 2. The configuration plane 104 illustratively includes an instruction port 106, instruction processing logic 108, and memory 110. The memory 110 may include non-volatile memory 112 (e.g., electronically erasable programmable read only memory (EEPROM), poly-fuse memory, and the like) and/or volatile memory 114 (e.g., random access memory (RAM)). The memory 110 may store configuration data for the programmable logic plane 102.

The instruction port 106 is configured to receive instructions for the PLD 100. For example, the instruction port 106 may include a boundary scan port, such as a JTAG port or an ISC port. The instruction port 106 may also include a configuration access port used to configure the PLD 100. The instruction port 106 is coupled to the instruction processing logic 108. The instruction processing logic 108 generates control signals for controlling the PLD 100 in response to instructions received via the instruction port 106. For example, the instruction processing logic 108 may generate control signals to test the PLD 100. The instruction processing logic 108 may produce control signals for reading, writing, and erasing the memory 110. The instruction processing logic 108 is also configured to allow a user to selectively disable ("lock-out") one or more instructions in the instruction set for the PLD 100. Exemplary embodiments of the instruction processing logic 108 are described below.

Figure 2:
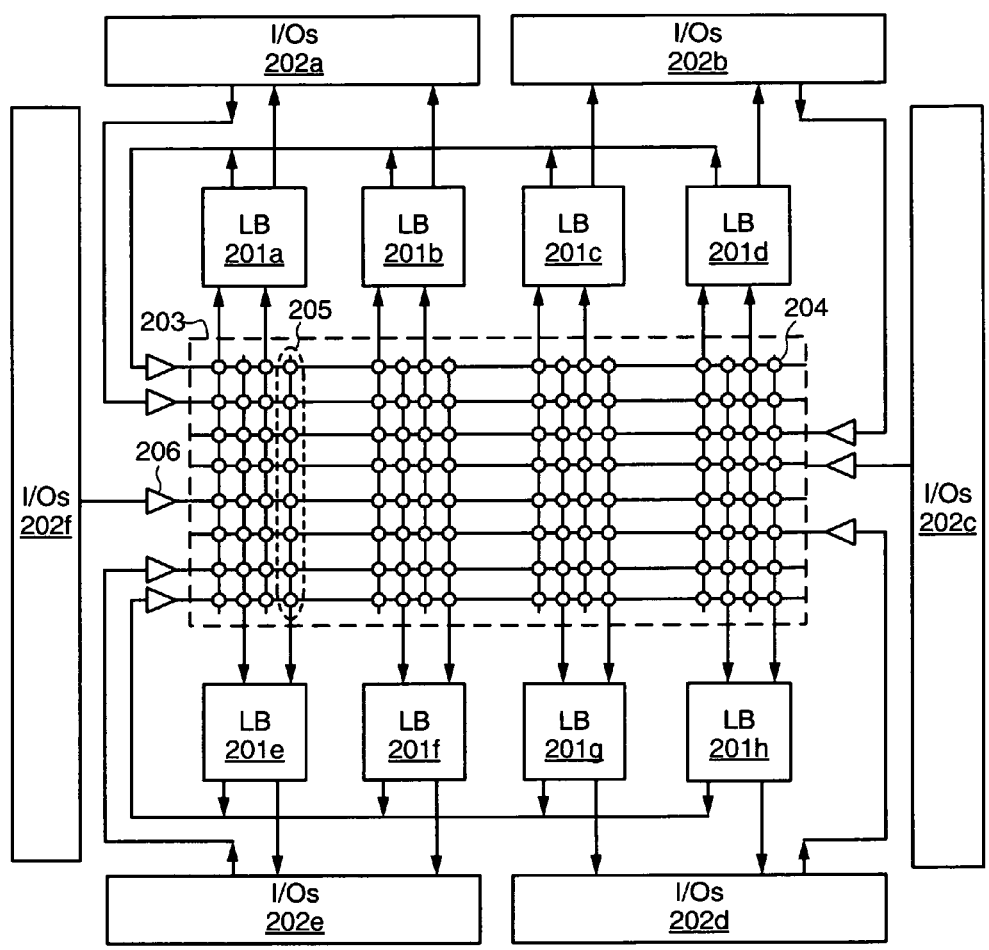
FIG. 2 is a simplified illustration of programmable logic in an exemplary CPLD.

FIG. 2 is a simplified illustration of programmable logic in an exemplary CPLD. A CPLD typically includes two or more logic blocks (LBs 201a-201h) connected together and to input/output blocks (I/Os 202a-202f) by a programmable interconnection array 203. Each logic block of the CPLD includes a two-level AND/OR structure similar to those used in Programmable Logic Arrays (PLAs) and Programmable Array Logic (PAL) devices. The interconnection array 203 includes many multiplexer circuits 205, each including several programmable interconnection points (PIPs) 204. In each multiplexer circuit 205, only one PIP 204 is enabled. The enabled PIP selects one of the many input signals provided to the interconnection array 203, and the selected input signal is provided as the output signal from the multiplexer circuit 205. Further information on CPLDs can be found, for example, in U.S. Pat. No. 6,466,049 B1 by Sholeh Diba et al., issued Oct. 15, 2002, which is incorporated by reference herein in its entirety.

Figure 3:
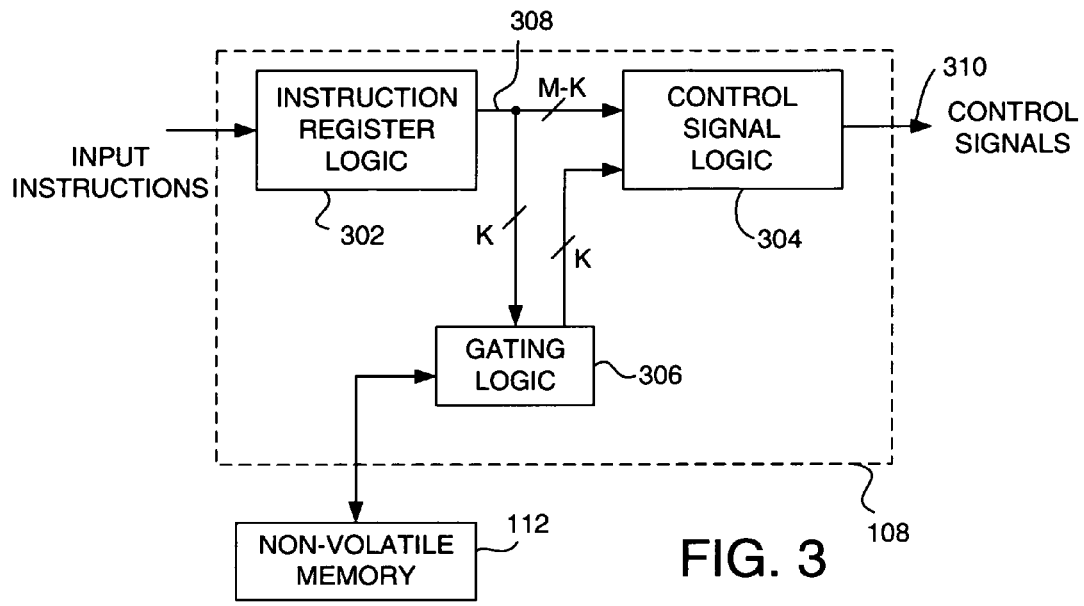
FIGS. 3 through 8 are block diagrams depicting exemplary embodiments of the instruction processing logic of FIG. 1 constructed in accordance with one or more aspects of the invention.

FIG. 3 is a block diagram depicting an exemplary embodiment of the instruction processing logic 108 of FIG. 1 constructed in accordance with one or more aspects of the invention. Elements of FIG. 3 that are the same or similar to those in FIG. 1 are designated with identical reference numerals and are described above. The instruction processing logic 108 comprises instruction register logic 302, control signal logic 304, and gating logic 306. An input port of the instruction register logic 302 is configured to receive input instructions from an instruction port (e.g., JTAG/ISC port). An output port of the instruction register logic 302 is coupled to an instruction bus 308 having M signal lines, where M is an integer greater than one. In one embodiment, instruction register logic 302 and control signal logic 304 can be found in the CoolRunner-II CPLD product from Xilinx, Inc. of San Jose Calif.

An input port of the gating logic 306 is configured to receive K of the signal lines in the instruction bus 308, where K is an integer greater than zero. Another port of the gating logic 306 is in communication with the non-volatile memory 112. An output port of the gating logic 306 having K signal lines is coupled to an input port of the control signal logic 304. Another input port of the control signal logic 304 is configured to receive M-K of the signal lines in the instruction bus 308. An output port of the control signal logic 304 is coupled to a control bus 310. The control bus 310 is configured to provide control signals for the PLD 100. FIG. 3 depicts the general case where K does not equal M. In the case where K=M, no signal lines are coupled to the control signal logic 304. Rather, all of the signal lines in the instruction bus 308 are routed to the control signal logic 304 through the gating logic 306.

In operation, the instruction register logic 302 stores and decodes each instruction. The instruction bus 308 includes a signal line for each possible instruction in the instruction set for the PLD (e.g., M instructions in the set). In response to an instruction, the instruction bus 308 asserts a signal on a signal line in the instruction bus 308 that corresponds to the instruction. Some of the instructions in the instruction set are "gated instructions" in that their corresponding signal lines are coupled to the control signal logic 304 through the gating logic 306. The control signal logic 304 generates control signals in response to each valid instruction to cause the PLD to perform a particular function.

For each gated instruction, the non-volatile memory 112 stores one or more security bits. The security bit(s) for each gated instruction may be configured to either allow or disallow the instruction. In particular, for each gated instruction, if the security bit(s) are configured to disallow the instruction, the gating logic 306 will cause the instruction to appear to be invalid at the control logic 304. Otherwise, the gating logic 306 provides the instruction to the control logic 304 for normal operation. In this manner, any number of instructions in the instruction set for the PLD may be locked-out by programming one or more security bits for the instruction in a non-volatile memory.

Figure 4:
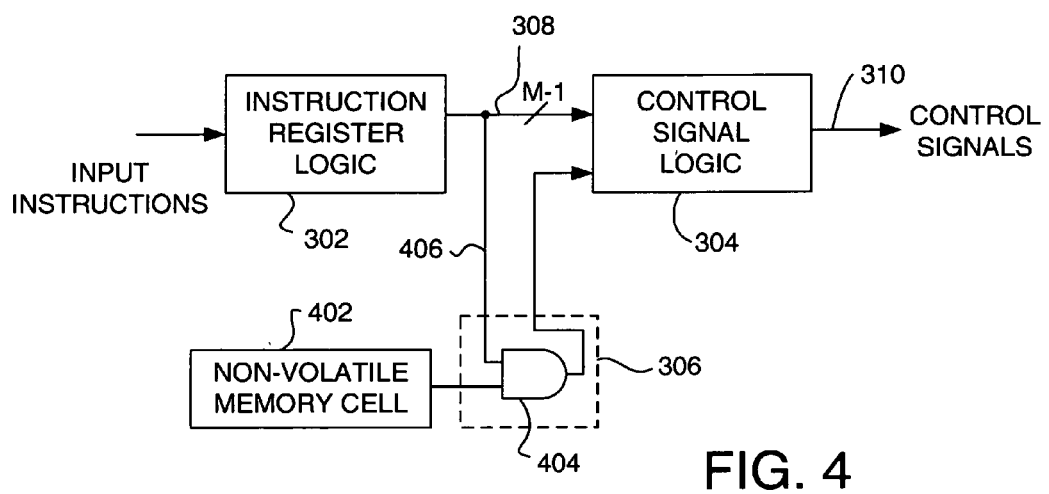

FIG. 4 is a block diagram depicting another exemplary embodiment of the instruction processing logic 108 of FIG. 1 constructed in accordance with one or more aspects of the invention. Elements of FIG. 4 that are the same or similar to those in FIGS. 1 and 3 are designated with identical reference numerals and are described above. In the present embodiment, the gating logic 306 comprises an AND gate 404. One input port of the AND gate 404 is coupled to a signal line 406 of the instruction bus 308. Another input port of the AND gate 404 is configured to receive output from a non-volatile memory cell 402.

The non-volatile memory cell 402 is configured to store a security bit for the instruction corresponding to the signal line 406. If the output of the non-volatile memory cell 402 is a logic "1", then the instruction will pass through the AND gate 404 to the control signal logic 304 and the instruction will perform its function as usual. If the output of the non-volatile memory cell 402 is a logic "0", then the AND gate 404 will always output a logic "0" and the instruction will appear as a "no-instruction" to the control signal logic 304. For purposes of clarity by example, only a single instruction in the instruction set is shown to be gated. It is to be understood, however, that any number of instructions may be gated in this manner. Notably, an AND gate and corresponding non-volatile memory cell may be provided for one or more instructions in the instruction set. In addition, those skilled in the art will appreciate that one or more logic gates may be used in place of the AND gate 404, including AND gate(s), OR gate(s), NOR gate(s), NAND gate(s), XOR gate(s), XNOR gate(s), and the like, as well as combinations thereof.

Figure 5:
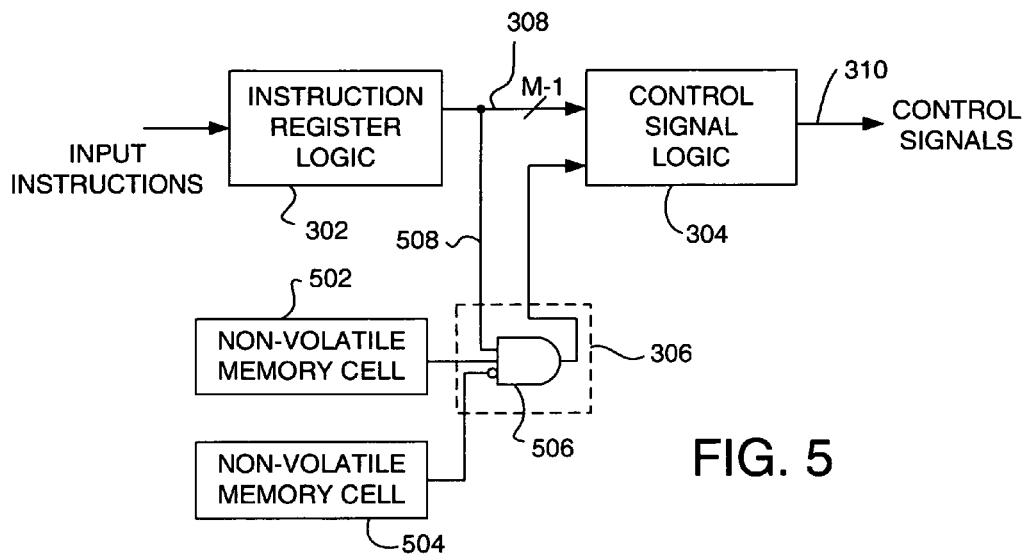

FIG. 5 is a block diagram depicting yet another exemplary embodiment of the instruction processing logic 108 of FIG. 1 constructed in accordance with one or more aspects of the invention. Elements of FIG. 5 that are the same or similar to those in FIGS. 1 and 3 are designated with identical reference numerals and are described above. In the present embodiment, the gating logic 306 includes an AND gate 506. One input of the AND gate 506 is coupled to a signal line 508 of the instruction bus 308. Another input of the AND gate 506 is configured to receive output from a non-volatile memory cell 502. Another input of the AND gate 506 is configured to receive a logically inverted version of output from a non-volatile memory cell 504.

The non-volatile memory cells 502 and 504 are configured to store security bits for the instruction corresponding to the signal line 508. In particular, the non-volatile memory cells 502 and 504 provide a two-bit security code. If the output of the non-volatile memory cell 502 is a logic "1" and the output of the non-volatile memory cell 504 is a logic "0", then the instruction will pass through the AND gate 506 to the control signal logic 304 and the instruction will perform its function as usual. Otherwise, the instruction will be locked-out. Thus, two bits of different polarity are required to lock-out the instruction. Using a bit-code instead of a single bit decreases the probability of the instructing being inadvertently or randomly locked-out. This is particularly important for an erase instruction, since once the erase instruction is locked-out, the PLD will no longer be reprogrammable. For purposes of clarity by example, a two-bit security code is shown. It is to be understood that any number of bits may be used to lock-out an instruction using any polarity configuration. In addition, while only a single instruction is shown to be gated, any number of instructions may be gated by including additional AND gates. Furthermore, those skilled in the art will appreciate that one or more logic gates may be used in place of the AND gate 506, including AND gate(s), OR gate(s), NOR gate(s), NAND gate(s), XOR gate(s), XNOR gate(s), and the like, as well as combinations thereof.

Figure 6:
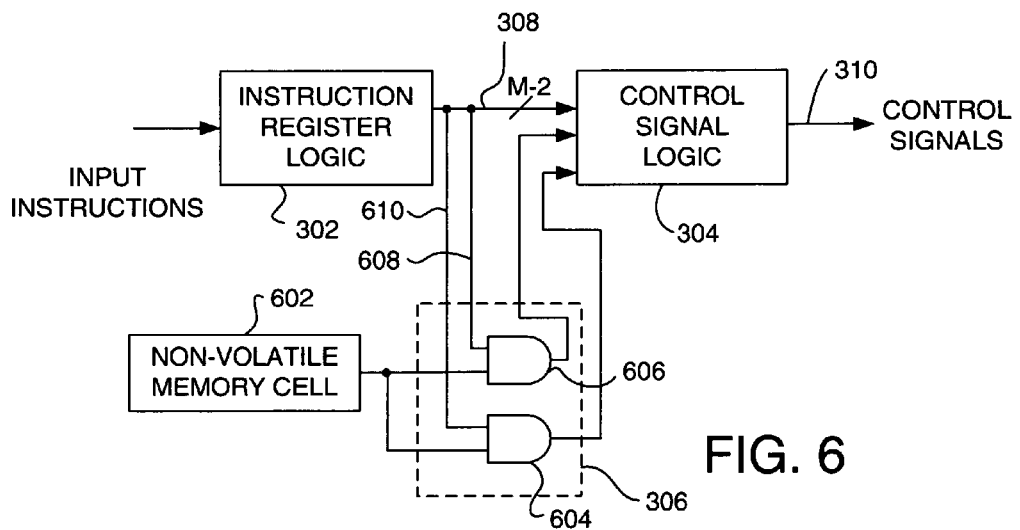

FIG. 6 is a block diagram depicting still another exemplary embodiment of the instruction processing logic 108 of FIG. 1 constructed in accordance with one or more aspects of the invention. Elements of FIG. 6 that are the same or similar to those in FIGS. 1 and 3 are designated with identical reference numerals and are described above. In the present embodiment, the gating logic 306 comprises an AND gate 604 and an AND gate 606. One input of the AND gate 604 is coupled to a signal line 610 of the instruction bus 308, and another input of the AND gate 604 is configured to receive output from a non-volatile memory cell 602. One input of the AND gate 606 is coupled to a signal line 608 of the instruction bus 308, and another input of the AND gate 606 is configured to receive the output from the non-volatile memory cell 602.

The non-volatile memory cell 602 is configured to store a security bit for the instructions corresponding to the signal lines 608 and 610. In this manner, a group of instructions may be locked-out using a security bit in the non-volatile memory cell 602. If the output of the non-volatile memory cell 602 is a logic "1", then the instructions will pass through the AND gates 604 and 606 to the control signal logic 304. If the output of the non-volatile memory cell 602 is a logic "0", then the AND gates 604 and 606 will always output a logic "0" and the instructions will each appear as a "no-instruction" to the control signal logic 304. Those skilled in the art will appreciate that, in general, any number of instructions in the instruction set may be locked-out as a group using a bit or bit-code (multiple bits). In addition, multiple groups of instructions may be locked out using different security bits or security bit-codes. Furthermore, those skilled in the art will appreciate that one or more logic gates may be used in place of the AND gates 604 and 606, including AND gates(s), OR gate(s), NOR gate(s), NAND gate(s), XOR gate(s), XNOR gate(s), and the like, as well as combinations thereof.

Figure 7:
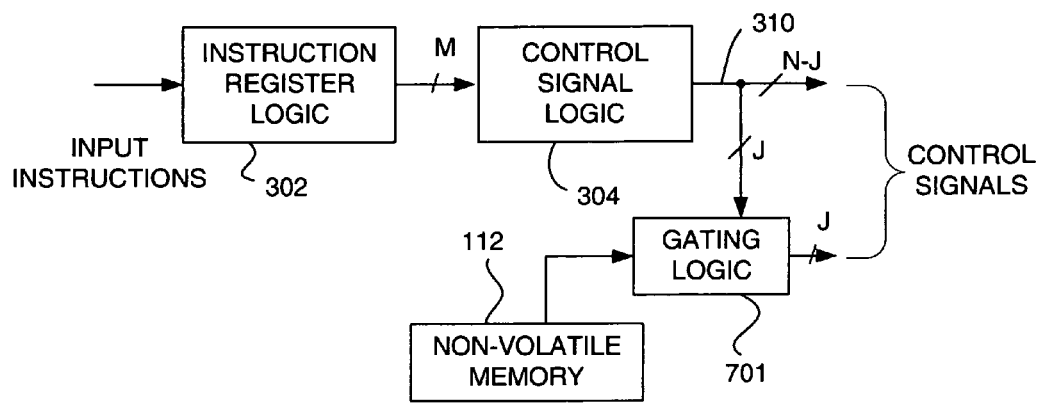

FIG. 7 is a block diagram depicting another exemplary embodiment of the instruction processing logic 108 of FIG. 1 constructed in accordance with one or more aspects of the invention. Elements of FIG. 7 that are the same or similar to those in FIGS. 1 and 3 are designated with identical reference numerals and are described above. In the present embodiment, no gating logic is provided between the instruction register 302 and the control signal logic 304. Thus, each instruction decoded by the instruction register logic 302 passes to the control signal logic 304. Security is obtained using gating logic 701 coupled to the control bus 310. In particular, an input port of the gating logic 704 is configured to receive J of the N signal lines in the control bus 310, where N is an integer greater than one and J is an integer greater than zero. Another port of the gating logic 701 is in communication with the non-volatile memory 112. An output port of the gating logic 306 includes J signal lines.

In the present embodiment, the gating logic 701 gates all of the control signals associated with an instruction rather than the instruction itself. In one embodiment, the gating logic 701 includes an AND gate for each control signal associated with a given instruction. Those skilled in the art will appreciate that the gating logic 701 may be implemented using one or more logic gates, including AND gate(s), OR gate(s), NOR gate(s), NAND gate(s), XOR gate(s), XNOR gate(s), and the like, as well as combinations thereof. The non-volatile memory 112 may store a security bit or security bit-code for locking out the control signals of a particular instruction. The control signals are gated at the output of the control logic 304, rather than further downstream, which decreases or eliminates the possibility that an instruction will be partially performed. Since most control signals are shared by a number of instructions, the present embodiment may only be effective in locking-out a group of instructions. Any number of instruction groups may be locked-out in this manner.

Figure 8:
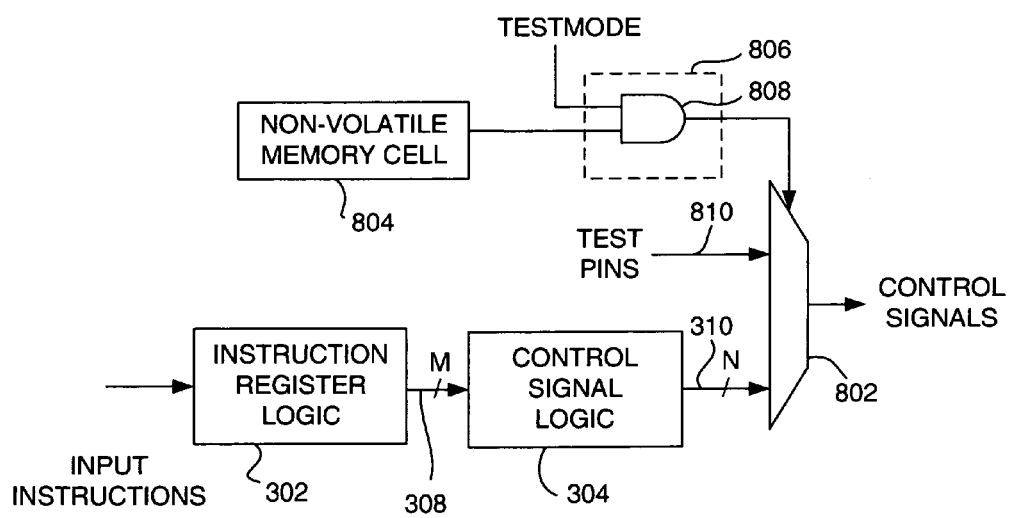

FIG. 8 is a block diagram depicting yet another exemplary embodiment of the instruction processing logic 108 of FIG. 1 constructed in accordance with one or more aspects of the invention. Elements of FIG. 8 that are the same or similar to those in FIGS. 1 and 3 are designated with identical reference numerals and are described above. The present embodiment is configured to provide lock-out capability for a testmode signal. In a PLD, such as a CPLD, the testmode signal bypasses the instruction register and control signal logic and uses test pin inputs for the control signals. Thus, the testmode signal is a "pseudo-instruction" in that it can be used to control the PLD to perform a function of an instruction, but it does not pass through the instruction register and control signal logic. Since the testmode signal may be used in place of an instruction, it may be desirable to provide the capability to lock-out the testmode signal.

In the present embodiment, gating logic 806 and a multiplexer 802 are provided. One input interface of the multiplexer 802 is coupled to one or more test pins of the PLD. Another input interface of the multiplexer 802 is coupled to the control bus 310. The gating logic 806 comprises an AND gate 808. An output port of the AND gate 808 is coupled to a control port of the multiplexer 802. An input port of the AND gate 808 is configured to receive the testmode signal. Another input port of the AND gate 808 is configured to receive output from a non-volatile memory cell 804.

In operation, if the output of the non-volatile memory cell 804 is a logic "1", then the testmode signal will pass through the AND gate 808 to control the multiplexer 802. The testmode signal is configured to cause the multiplexer 802 to controllably select control signals from either the test pins 810 or the control signal logic 304. If the output of the non-volatile memory cell 804 is a logic "0", then the AND gate 808 will always output a logic "0", which will cause the multiplexer 802 to never select the test pins 810 for control signals. While a single security bit is described, it is to be understood that a security bit code may be used to gate the testmode signal. The embodiment shown in FIG. 8 for gating the testmode signal may be combined with any of the other embodiments shown in FIGS. 3 through 7 for gating instruction(s). Those skilled in the art will appreciate that one or more logic gates may be used in place of the AND gate 806, including AND gate(s), OR gate(s), NOR gate(s), NAND gate(s), XOR gate(s), XNOR gate(s), and the like, as well as combinations thereof.

In each of FIGS. 3 through 8, it is assumed that the non-volatile memory and memory cells produces a logic high and a logic low. Some non-volatile memory circuitry does not produce a logic highs or lows. It is well known in the art that such non-volatile memory circuitry can be sensed and the value stored in a cell that will produce a logic high or a logic low.

Method and apparatus for secure programmable logic devices has been described. An aspect of the invention relates to logically combining security bit(s) stored in non-volatile memory with a decoded instruction or group of instructions in order to allow or disallow (i.e., lock-out) the instruction or group of instructions. The security mechanism of the invention may be used to protect various aspects of a PLD. For example, the security mechanism may be used to protect configuration data (configuration pattern) stored in the configuration memory of the PLD from being read or written.

An embodiment of the invention can also provide security beyond gating read/write instructions for configuration pattern security. Notably, some embodiments of the invention advantageously allow locking out an erase instruction, which will prevent the PLD from being changed in any way under programming command or instruction from a user. Other embodiments of the invention can be used to lock out various JTAG commands that may be deemed to be "invasive". For example, in a CPLD, invasive JTAG commands are commands that permit the user to read back the internal contents of the macrocell values, which can be used to reverse engineer a design. There are also instances of "JTAG Board Attacks," whereby hackers can disrupt board behavior by driving commands into the JTAG port, which can deleteriously affect overall board behavior.

Since JTAG instructions are part of the overall instruction set of the PLD, embodiments of the invention are capable of locking-out one or more of such JTAG instructions. For example, an embodiment of the invention can be used to lock-out the IDCODE instruction. The IDCODE is a bit pattern that identifies the chip and can be shifted out of the device using the IDCODE instruction.

Thus, embodiments of the invention can be used to provide a set of user selectable options for a PLD to permit users to tailor the exact nature of the security mechanism. For example, one option could be to gate the read and write instructions to protect the configuration pattern ("option 1"). Another option could be to gate intrusive JTAG commands ("option 2"). Yet another option could be to gate the erase instruction ("option 3"). Still other options could be to employ combination of the aforementioned options 1, 2, and 3. Table 1 illustrates exemplary instructions for a CPLD and whether or not such instructions are gated in accordance with exemplary options 1, 2 and 3, as well as combinations thereof. In Table 1, "No" means the given operation is gated in accordance with the given option, and "Yes" means the given operation functions normally.

TABLE 1

| Operation | Opt. 1 | Opt. 2 | Opt. 3 | Opt. 1 + 2 | Opt. 1 + 3 | Opt. 2 + 3 | Opt. 1 + 2 + 3 |
|---|---|---|---|---|---|---|---|
| ISC Instructions Valid | | | | | | | |
| Program | No | Yes | No | No | No | No | No |
| Noop | Yes | Yes | Yes | Yes | Yes | Yes | Yes |
| Init | No | Yes | Yes | No | No | Yes | No |
| Erase | Yes | Yes | No | Yes | No | No | No |
| Read | No | Yes | Yes | No | No | Yes | No |
| SRAM Write | No | Yes | No | No | No | No | No |
| SRAM Read | No | Yes | Yes | No | No | Yes | No |
| ISO Modes Valid | | | | | | | |
| Enable (1) | Yes | Yes | Yes | Yes | Yes | Yes | Yes |
| Enable OTF (2) | Yes | Yes | Yes | Yes | Yes | Yes | Yes |
| En_clamp | Yes | Yes | Yes | Yes | Yes | Yes | Yes |
| Disable | Yes | Yes | Yes | Yes | Yes | Yes | Yes |
| JTAG Instructions Valid | | | | | | | |
| EXTEST | Yes | No | Yes | No | Yes | No | No |
| PRELOAD | Yes | No | Yes | No | Yes | No | No |
| INTEST | Yes | No | Yes | No | Yes | No | No |
| CLAMP | Yes | No | Yes | No | Yes | No | No |
| HIGHZ | Yes | No | Yes | No | Yes | No | No |
| BYPASS | Yes | Yes | Yes | Yes | Yes | Yes | Yes |
| IDCODE | Yes | Yes | Yes | Yes | Yes | Yes | Yes |
| USERCODE | Yes | Yes | Yes | Yes | Yes | Yes | Yes |
| Test Mode Instructions | | | | | | | |
| Test_enable | No | No | No | No | No | No | No |
| Bulkprog | No | No | No | No | No | No | No |
| mverify | No | No | No | No | No | No | No |
| Erase_all | No | No | No | No | No | No | No |
| Test_disable | No | No | No | No | No | No | No |
| STCtest | No | No | No | No | No | No | No |

Table 1 lists illustrative in-system configuration (ISC) instructions, ISC modes, JTAG instructions, and test mode instructions. Such instructions are well-known in the art. Those skilled in the art will appreciate that various other options may be implemented for the instructions listed in Table 1. In addition, those skilled in the art will appreciate that various other types instructions (e.g., other ISC or JTAG instructions) may be added to the list in Table 1.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

The invention claimed is:

1. Apparatus for securing an integrated circuit device having instruction register logic coupled to control logic via an instruction bus, comprising:
   a non-volatile memory for storing at least one security bit for at least one instruction associated with said programmable logic device; and
   gating logic in communication with said non-volatile memory and at least a portion of said instruction bus, said gating logic configured to selectively gate decoded instructions transmitted from said instruction register logic towards said control logic based on state of said at least one security bit.

2. The apparatus of claim 1, wherein said at least one security bit comprises a security bit for each said at least one instruction.

3. The apparatus of claim 1, wherein said at least one security bit comprises multiple security bits for each said at least one instruction.

4. The apparatus of claim 1, wherein said at least one instruction includes a group of instructions, and wherein said at least one security bit is associated with said group of instructions.

5. The apparatus of claim 1, wherein said gating logic comprises at least one logic gate respectively associated with said at least one instruction.

6. The apparatus of claim 5, wherein each said at least one logic gate is configured to receive output from a memory cell in said non-volatile memory.

7. The apparatus of claim 5, wherein each said at least one logic gate is configured to receive output from a plurality of memory cells in said non-volatile memory.

8. The apparatus of claim 1, wherein said gating logic comprises a plurality of logic gates associated with each said at least one instruction.

9. The apparatus of claim 8, wherein, for each said at least one instruction, each said plurality of logic gates is configured to receive output from a memory cell in said non-volatile memory.

10. The apparatus of claim 1, further comprising:
    a multiplexer configured to receive output from said control signal logic and test pins of said programmable logic device; and
    additional gating logic in communication with said non-volatile memory for controllably causing said multiplexer to select between said output from said control signal logic and said test pins.

11. The apparatus of claim 1, wherein said at least one instruction comprises at least one of: a) an erase instruction; and b) one or more boundary scan instructions.

12. The apparatus of claim 1, wherein said programmable logic device comprises one of a complex programmable logic device (CPLD) and a field programmable gate array (FPGA).

13. A method for securing an integrated circuit device having instruction register logic coupled to control logic via an instruction bus, comprising:
    storing at least one security bit for at least one instruction associated with said integrated circuit device; and
    selectively gating decoded instructions transmitted from said instruction register logic towards said control logic based on state of said at least one security bit.

14. The method of claim 13, wherein said at least one security bit comprises a security bit for each said at least one instruction.

15. The method of claim 13, wherein said at least one security bit comprises multiple security bits for each said at least one instruction.

16. The method of claim 13, wherein said at least one instruction includes a group of instructions, and wherein said at least one security bit is associated with said group of instructions.

17. The method of claim 13, wherein said at least one instruction comprises at least one of: a) an erase instruction; and b) one or more boundary scan instructions.

18. The method of claim 13, wherein said at least one security bit for said at least one instruction is stored in a non-volatile memory within said programmable logic device.

19. The method of claim 18, wherein said programmable logic device comprises one of a complex programmable logic device (CPLD) and a field programmable gate array (FPGA).

20. Apparatus for securing an integrated circuit device having instruction register logic coupled to control logic having a control bus, comprising:
    a non-volatile memory for storing at least one security bit for instructions associated with said integrated circuit device; and
    gating logic in communication with said non-volatile memory and at least a portion of said control bus, said gating logic configured to selectively gate control signals produced by said control logic based on state of said at least one security bit, said control logic generating said control signals in response to decoded instructions from said instruction register logic.

* * * * *